(12) United States Patent
Park

(10) Patent No.: US 11,192,603 B2
(45) Date of Patent: Dec. 7, 2021

(54) FOOT BRAKE STRUCTURE FOR MOBILITY DEVICE

(71) Applicants:Hyundai Motor Company, Seoul (KR); Kia Motors Corporation, Seoul (KR)

(72) Inventor: Jun Hwan Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 78 days.

(21) Appl. No.: 16/691,167

(22) Filed: Nov. 21, 2019

(65) Prior Publication Data
US 2020/0298932 A1    Sep. 24, 2020

(30) Foreign Application Priority Data
Mar. 19, 2019    (KR) .......................... 10-2019-0031011

(51) Int. Cl.
*B62L 3/04*    (2006.01)
*B62L 1/04*    (2006.01)
*A63C 17/14*    (2006.01)

(52) U.S. Cl.
CPC ............ *B62L 3/04* (2013.01); *A63C 17/1427* (2013.01); *B62L 1/04* (2013.01)

(58) Field of Classification Search
CPC . B62L 3/04; B62L 1/04; A63C 17/148; A63C 17/1427; A63C 2017/1463; A63C 17/14
USPC .................. 188/4 R, 29; 280/11.215, 11.217
See application file for complete search history.

(56) References Cited

U.S. PATENT DOCUMENTS

| | | | | |
|---|---|---|---|---|
| 4,003,582 A | * | 1/1977 | Maurer | A63C 17/01 280/11.215 |
| 4,055,234 A | * | 10/1977 | Burton | A63C 17/01 188/2 R |
| 4,084,831 A | * | 4/1978 | Akonteh | A63C 17/01 188/29 |

(Continued)

FOREIGN PATENT DOCUMENTS

DE     102012021808 A1 *  5/2013 ......... A63C 17/1427
KR     10-2009-0114622 A    11/2009

OTHER PUBLICATIONS

EPO translation, DE 102012021808 A1. (Year: 2013).*
Dialog translation, Li; Siqi, CN 205769918 U. (Year: 2016).*
Dialog translation, Liu; Songxin, CN 206107473 U. (Year: 2017).*

*Primary Examiner* — Thomas J Williams
(74) *Attorney, Agent, or Firm* — Mintz Levin Cohn Ferris Glovsky and Popeo, P.C.; Peter F. Corless

(57) ABSTRACT

A foot brake structure for a mobility device includes: a footboard having an upper surface extending in a plane direction and having a rear wheel at a rear thereof; and a friction plate positioned above the rear wheel, having a portion extending forward of the rear wheel and rotatably assembled to a rear end of the footboard by a rotating shaft, and having a lower surface brought into contact with or spaced apart from a surface of the rear wheel depending on whether or not the friction plate is rotated around the rotating shaft, wherein when the friction plate is rotated around the rotating shaft by an external force, the lower surface of the friction plate is brought into contact with the surface of the rear wheel, thereby applying a braking force to the rear wheel.

9 Claims, 5 Drawing Sheets

(56) References Cited

U.S. PATENT DOCUMENTS

| | | | | |
|---|---|---|---|---|
| 4,166,519 | A * | 9/1979 | Maloney | A63C 17/01 |
| | | | | 188/2 R |
| 4,799,701 | A * | 1/1989 | Lindau | B62K 3/002 |
| | | | | 188/74 |
| 6,139,035 | A * | 10/2000 | Tsai | B62K 3/002 |
| | | | | 280/11.201 |
| 6,311,994 | B1 * | 11/2001 | Wang | B62K 3/002 |
| | | | | 280/267 |
| 6,352,270 | B1 * | 3/2002 | Wu | B62K 3/002 |
| | | | | 188/19 |
| 8,813,892 | B2 * | 8/2014 | Hadley | B62L 1/00 |
| | | | | 180/220 |
| 2002/0056595 | A1 * | 5/2002 | Shaw | B60T 1/04 |
| | | | | 188/5 |
| 2005/0046273 | A1 * | 3/2005 | Jung | B60T 7/042 |
| | | | | 303/113.4 |
| 2005/0173980 | A1 * | 8/2005 | Bohm | B60T 8/3255 |
| | | | | 303/155 |

* cited by examiner

FOOT BRAKE STRUCTURE FOR MOBILITY DEVICE

CROSS REFERENCE TO RELATED APPLICATION

The present application claims under 35 U.S.C. § 119(a) the benefit of Korean Patent Application No. 10-2019-0031011, filed on Mar. 19, 2019, the entire contents of which are incorporated by reference herein.

BACKGROUND

1. Technical Field

The present disclosure relates to a foot brake structure for a mobility device, more particularly, to a foot brake used for a small mobility device which generates a braking force when pressed by a user's foot.

2. Description of the Related Art

Recently, there has been growing interest in and development of small and lightweight mobility devices used in short distance travel. For example, one type of small mobility device is a kickboard that includes front and rear wheels respectively positioned at a front and rear of a footboard and a steering wheel for steering the front wheel. In general, the kickboard moves forward by a user contacting the ground with one foot; however, an electric kickboard generates a drive force by using motor power.

This type of small mobility device uses a braking device such as a handbrake operated when held by a user's hand, a foot brake operated when pressed by a user's foot, or similar braking mechanism.

The handbrake is disadvantageous in that it utilizes a cable for transmitting a tensile force, and accordingly, has many components requiring maintenance, and has an operation capability that varies depending on a connection path of the cable, and a limitation in folding the kickboard depending on an allowed value for bending the cable.

In particular, when using a disk brake, an accident may occur due to heating of a rotor or a sharp surface of the rotor.

Meanwhile, the foot brake is disadvantageous in that it is operates only by a force generated when pressed by a user's foot, and thus may have an insufficient braking force. Further, the foot brake typically uses rubber or plastic for generating a restoring force in the foot brake, and thus may have insufficient durability.

The contents described as the related art are provided only to assist in understanding the background of the present disclosure and should not be considered as corresponding to the related art known to those having ordinary skill in the art.

SUMMARY

An object of the present disclosure is to provide a foot brake structure for a mobility device having an improved braking force by amplifying an external force applied by a user.

According to an embodiment of the present disclosure, a foot brake structure for a mobility device may include: a footboard having an upper surface extending in a plane direction and having a rear wheel at a rear thereof; and a friction plate positioned above the rear wheel, having a portion extending forward of the rear wheel and rotatably assembled to a rear end of the footboard by a rotating shaft, and having a lower surface brought into contact with or spaced apart from a surface of the rear wheel depending on whether or not the friction plate is rotated around the rotating shaft, wherein when the friction plate is rotated around the rotating shaft by an external force, the lower surface of the friction plate is brought into contact with the surface of the rear wheel, thereby applying a braking force to the rear wheel, and an action point at which the friction plate applies the braking force to the rear wheel is closer to the rotating shaft of the friction plate than a press point at which the external force is applied (e.g., by a user), thereby amplifying the braking force.

The friction plate may be formed in a shape extending to sides of the rear wheel and partially surround the sides of the rear wheel.

The lower surface of the friction plate may have a contact portion protruding toward a side of the surface of the rear wheel, and when the friction plate is rotated around the rotating shaft by the external force and the lower surface of the friction plate is brought into contact with the surface of the rear wheel, the action point at which the friction plate applies the braking force to the rear wheel may be positioned at the contact portion.

The contact portion may be positioned on each of both sides of a center of a ground contact surface on which the rear wheel is in contact with a ground and may apply the braking force to each of the both sides of the center of the ground contact surface when the friction plate is in contact with the surface of the rear wheel.

The center of the ground contact surface on which the rear wheel is in contact with the ground may be spaced apart from the lower surface of the friction plate even when the friction plate is rotated around the rotating shaft and the lower surface of the friction plate is brought into contact with the surface of the rear wheel.

The foot brake structure for a mobility device may further include a magnetic body positioned at the portion of the friction plate and generating magnetic force between the footboard and the magnetic body so that the friction plate is rotated around the rotating shaft in a direction in which the friction plate is spaced apart from the surface of the rear wheel.

The magnetic body may be positioned above the rotating shaft of the friction plate and generate an attractive force by the magnetic force between the rear end of the footboard and the magnetic body.

The magnetic body may generate the magnetic force so that the friction plate is rotated around the rotating shaft and thus the portion of the friction plate is brought into contact with the rear end of the footboard when no external force is applied to the friction plate.

The foot brake structure for a mobility device may further include a magnetic field sensor positioned at the rear end of the footboard and sensing a change in a magnetic field of the magnetic body as the friction plate is rotated around the rotating shaft.

The foot brake structure for a mobility device may further include an elastic body positioned between the portion of the friction plate and the rear end of the footboard and generating an elastic force so that the friction plate is rotated around the rotating shaft in a direction in which the friction plate is spaced apart from the surface of the rear wheel.

The foot brake structure for a mobility device may further include: an angle sensor positioned at the rear end of the footboard and sensing a rotation angle at which the friction plate is rotated around the rotating shaft; or a distance sensor sensing a distance between the rear end of the footboard and the friction plate.

DETAILED DESCRIPTION OF THE EMBODIMENTS

Figure 1:
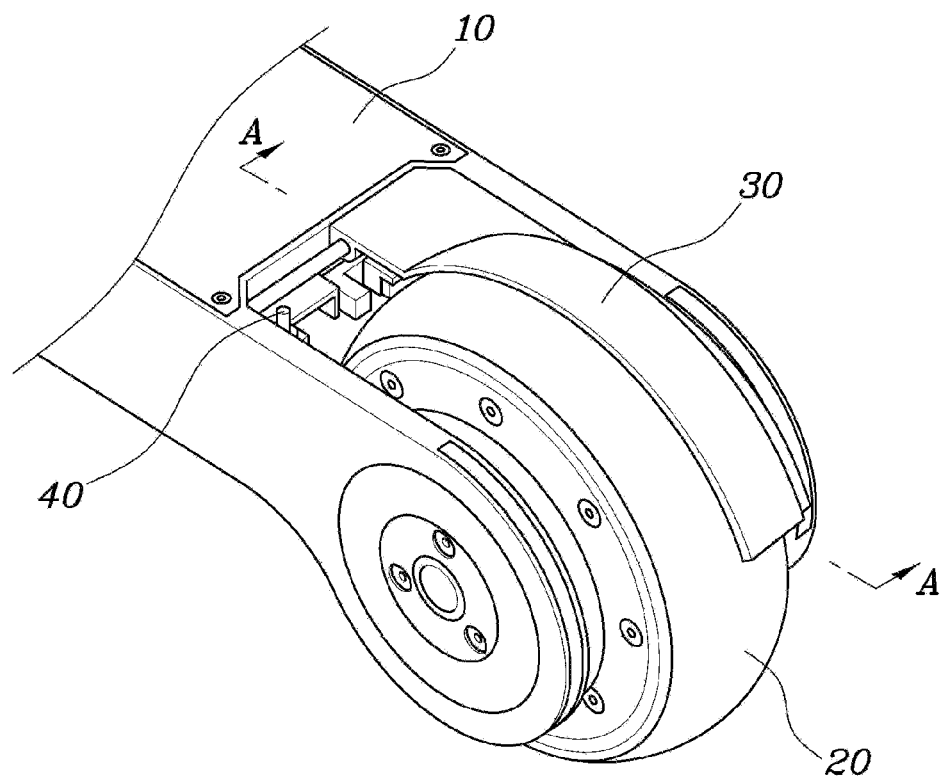
FIGS. 1 and 2 (RELATED ART) are views illustrating a conventional foot brake structure for a mobility device.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific descriptions on structure and function of embodiments of the present disclosure described herein are merely illustrative and not construed to limit the disclosure thereto.

Since the present disclosure may be variously modified and have several exemplary embodiments, specific exemplary embodiments will be shown in the accompanying drawings and be described in detail. However, it is to be understood that the present disclosure is not limited to the specific exemplary embodiments, but includes all modifications, equivalents, and substitutions included in the spirit and the scope of the present disclosure.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present disclosure.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between," "directly between," "neighboring to," "directly neighboring to" and the like, should be similarly interpreted.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, preferred embodiments of the present disclosure will be described in detail with reference to the accompanying drawings. Like reference numerals denote like components throughout the drawings.

Figure 2:
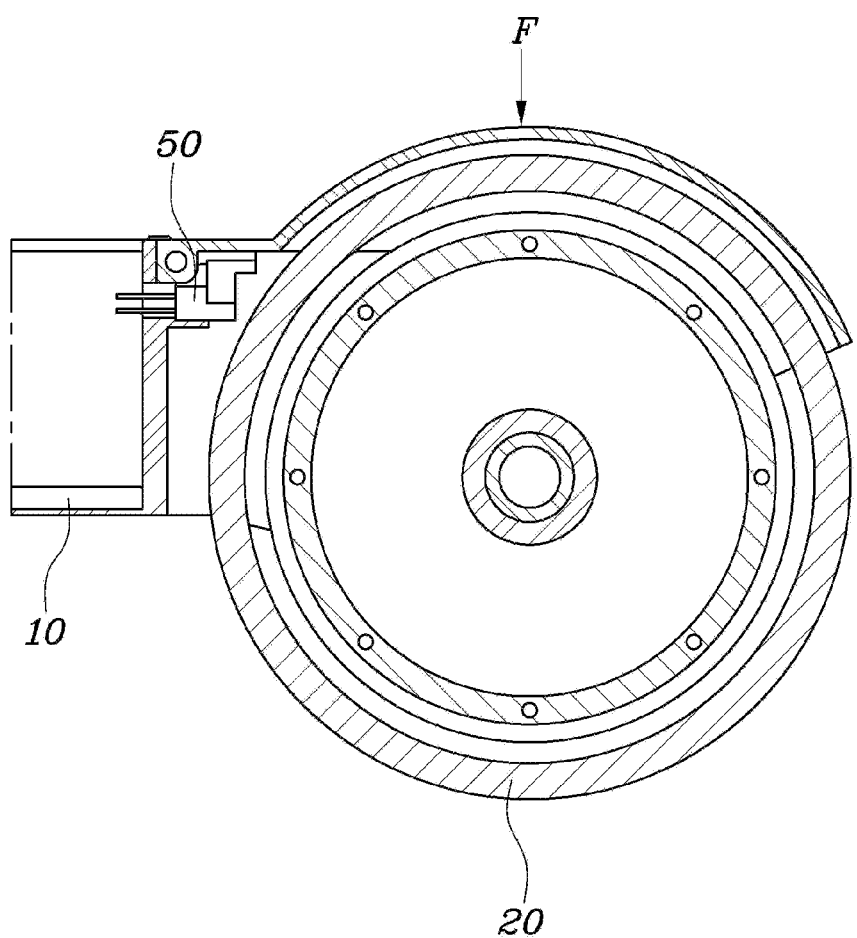

FIGS. 1 and 2 (RELATED ART) are views illustrating a conventional foot brake structure for a mobility device.

Referring to FIGS. 1 and 2, a conventional foot brake structure for a mobility device includes a footboard 10, a rear wheel 20 rotatably assembled to a rear end of the footboard 10, and a friction plate 30 rotatably assembled to the rear end of the footboard 10, in which when applied with an external force, the friction plate 30 is brought into contact with a surface of the rear wheel 20, thereby applying a braking force to the real wheel 20.

However, as illustrated in FIG. 2, in the conventional foot brake structure, a press point at which a user applies an external force to the friction plate 30 for braking the mobility device has the same position as an action point of a braking force at which the friction plate 30 applies the braking force to the surface of the rear wheel 20.

That is, the conventional foot brake structure has a problem in that magnitude of the external force applied by the user is the same as or similar to that of the braking force applied to the surface of the rear wheel 20, which results in an insufficient braking force.

Further, the conventional foot brake structure includes a rubber elastic body 40 that applies an elastic force in a direction in which the friction plate 30 is spaced apart from the surface of the rear wheel 20 when no external force is applied to the friction plate 30.

However, the rubber elastic body 40 is formed of a soft material, and thus easily worn or broken due to insufficient durability thereof; therefore, there are frequent problems in that the friction plate 30 fails to be spaced apart from the surface of the rear wheel 20.

Further, the conventional foot brake structure uses an optical sensor 50 to detect a relative position of the friction plate 30. For example, the conventional foot brake structure uses a photo interrupter sensor 50 to detect a position of the friction plate 30 when an optical path is interrupted.

However, due to particles such as dust, etc. generated from the rear wheel 20 rotated on a ground and then introduced into the optical sensor 50, errors frequently occur in using the optical sensor 50 to detect the position of the friction plate 30.

Figure 3:
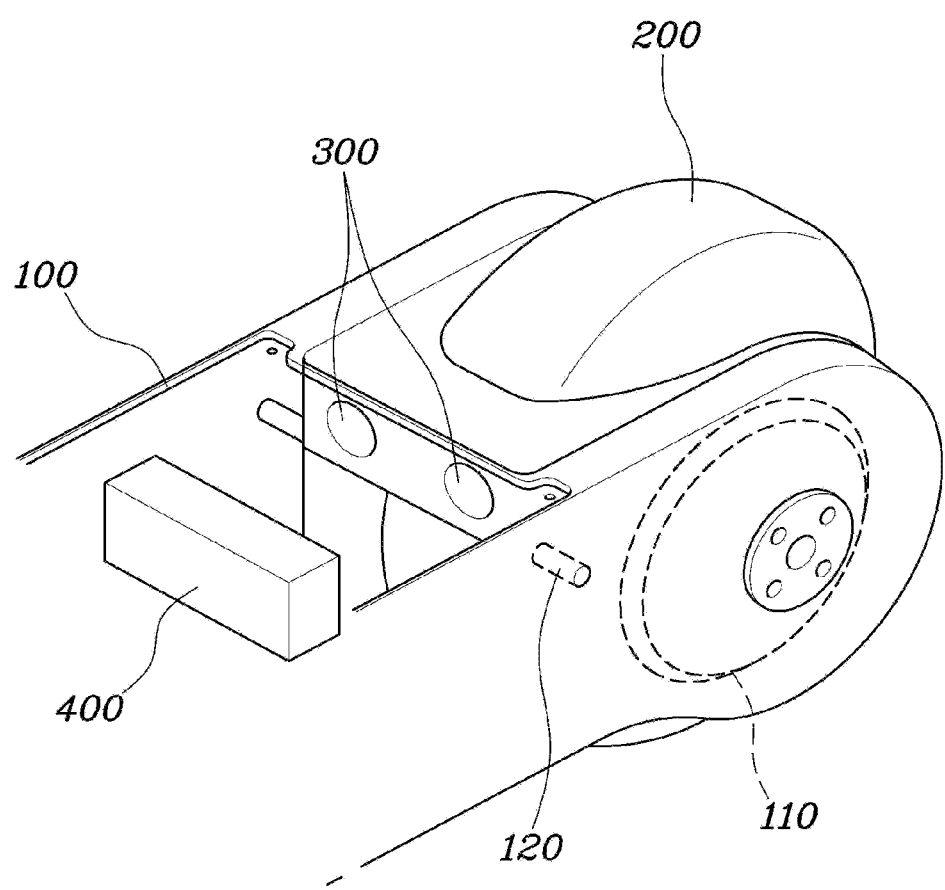
FIG. 3 is a perspective view illustrating a foot brake structure for a mobility device according to an embodiment of the present disclosure.
Figure 4:
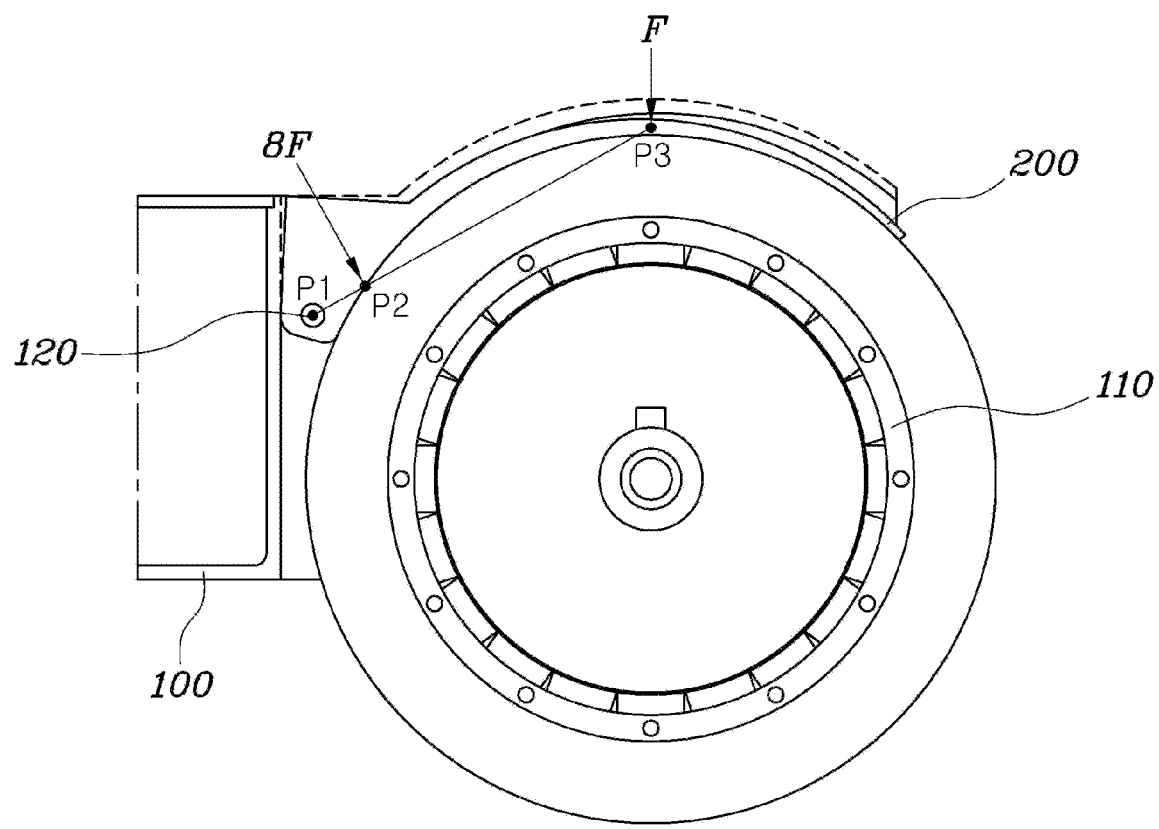
FIG. 4 is a cross-sectional view illustrating the foot brake structure for a mobility device according to an embodiment of the present disclosure.

FIG. 3 is a perspective view illustrating a foot brake structure for a mobility device according to an embodiment of the present disclosure; and FIG. 4 is a cross-sectional view illustrating the foot brake structure for a mobility device according to an embodiment of the present disclosure.

Referring to FIGS. 3 and 4, the foot brake structure for a mobility device according to an embodiment of the present disclosure may include: a footboard 100 having a flat upper surface extending in a plane direction and having a rear wheel 110 at a rear thereof; and a friction plate 200 positioned above the rear wheel 110, having a portion extending forward of the rear wheel 110 and rotatably assembled to a rear end of the footboard 100 by a rotating shaft 120, and having a lower surface brought into contact with or spaced apart from a surface of the rear wheel 110 depending on whether or not the friction plate is rotated around the rotating shaft 120, wherein when the friction plate 200 is rotated around the rotating shaft 120 by an external force, the lower surface of the friction plate 200 is brought into contact with the surface of the rear wheel 110, thereby applying a braking force to the rear wheel 110, and an action point P2 at which the friction plate 200 applies the braking force to the rear wheel 110 is closer to the rotating shaft 120 of the friction plate 200 than a press point P3 at which a user applies the external force is, thereby amplifying the braking force.

The mobility device of the present disclosure may be a motor kickboard driven when a user's foot is placed safely on an upper surface of the footboard 100.

The footboard 100 may be a planar-shaped or a rectangular-shaped member having an upper surface extending in a planar direction so that the user's foot is placed safely thereon.

A front wheel may be provided at a front of the footboard 100 and the rear wheel 110 may be provided at a rear of the footboard 100. A tire is coupled to each of outer surfaces of the front wheel and the rear wheel 110, and thus the front wheel and the rear wheel 110 may each have a ground contact surface. Both the front wheel and the rear wheel 110 are rotatably assembled to the footboard 100, and then a motor for generating driving force is connected to the front wheel and the rear wheel 110 and then rotates the front wheel and the rear wheel 110.

The friction plate 200 may have the portion rotatably assembled to the rear end of the footboard 100. In particular, the friction plate 200 is positioned above the rear wheel 110 and rotatably assembled to the rear end of the footboard 100. Therefore, the friction plate 200 is rotated around the rear end of the footboard 100 and may be brought into contact with or spaced apart from the surface of the rear wheel 110. The rotating shaft 120, by which the friction plate 200 is rotated around the footboard 100, may be parallel to a rotation axis of the rear wheel 110.

When applied with no external force, the friction plate 200 may be kept in a state of being above the rear wheel 110 and spaced apart from the surface of the rear wheel 110. Alternatively, when applied with an external force by the user, the friction plate 200 may be rotated around the rotating shaft 120 and the lower surface of the friction plate 200 may be brought into contact with the surface of the rear wheel 110, thereby applying the braking force to the rear wheel 110.

Regardless of whether the lower surface of the friction plate 200 is in contact the rear wheel 110 partially or entirely, the action point P2 at which the friction plate 200 applies the braking force to the rear wheel 110 may be closer to the rotating shaft 120 of the friction plate 200 than a press point P3 at which a user applies the external force.

That is, a fixed point P1 of the friction plate 200 is positioned at the rotating shaft 120 by which the friction plate 200 is assembled to the footboard 100, the action point P2 of the braking force is positioned relatively close to the fixed point P1, and the press point P3 on which the external force acts is positioned relatively away from the fixed point P1, thereby amplifying the braking force. Accordingly, the braking force has a magnitude amplified greater than that of the external force applied by the user, so that a greater braking force may be generated even with a smaller external force.

For example, the action point P2 of the braking force may be set in such a manner that the braking force of the friction plate 200 is eight times greater than the external force acting above the rotation axis, around which the rear wheel 110 rotates, in a direction perpendicular to the ground. That is, a distance P1 to P3 may become eight times longer than a distance P1 to P2, in which the distance P1 to P3 refers to a distance from the fixed point P1 of the rotating shaft 120, by which the friction plate 200 is assembled to the footboard 100, to the press point P3 on which the external force acts; and the distance P1 to P2 refers to a distance from the fixed point P1 of the rotating shaft 120, by which the friction plate 200 is assembled to the footboard 100, to the action point P2 of the braking force.

The friction plate 200 may be formed in a shape extending to sides of the rear wheel 110 and partially surround the sides of the rear wheel 110. That is, the friction plate 200 may be positioned above the rear wheel 110 and cover the upper surface of the rear wheel 110, and may also extend to the sides of the rear wheel 110 to partially cover the sides of the rear wheel 110. Accordingly, it is possible to prevent the foreign material (soil, dust, water, etc.) generated due to the rear wheel 110 being rotated in contact with the ground from flowing into the rotating shaft 120 of the friction plate 200 or a motor positioned in the rear wheel 110, thereby protection from the environment such as being dustproof and waterproof.

In addition, as described below, the braking force may be applied to the surface of the rear wheel 110 at each side of the ground contact surface of the rear wheel 110.

In particular, the lower surface of the friction plate 200 may have a contact portion 210 protruding toward a side of the surface of the rear wheel 110, and when the friction plate 200 is rotated around the rotating shaft 120 by the external force and the lower surface of the friction plate 200 is brought into contact with the surface of the rear wheel 110, the action point P2 at which the friction plate 200 applies the braking force to the rear wheel 110 may be positioned at the contact portion 210.

Figure 5:
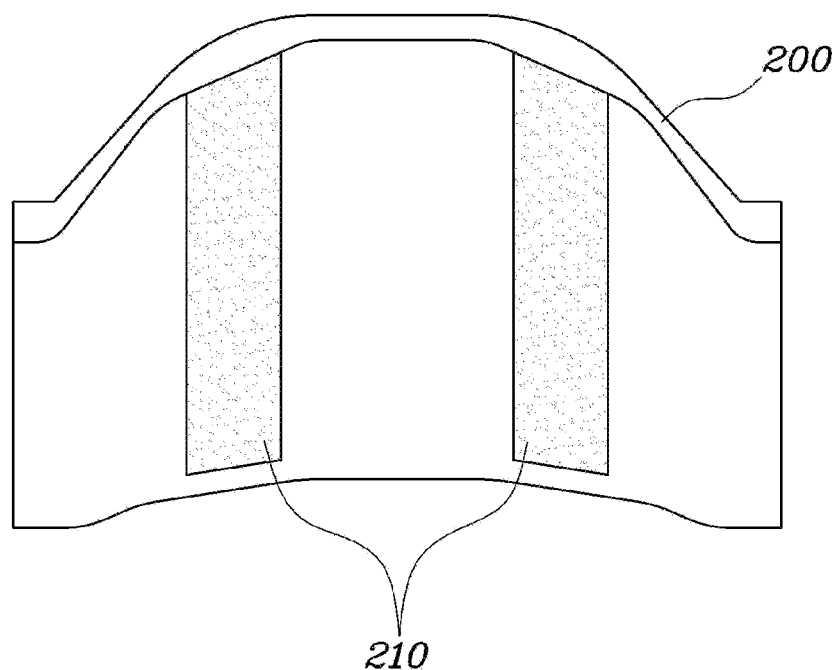
FIG. 5 is a view illustrating a lower surface of a friction plate of the foot brake structure for a mobility device according to an embodiment of the present disclosure.

FIG. 5 is a view illustrating a lower surface of a friction plate of the foot brake structure for a mobility device according to an embodiment of the present disclosure.

Referring to FIG. 5, a certain area of the lower surface of the friction plate 200 may have the contact portion 210 protruding toward the side of the surface of the rear wheel 110. Therefore, when the friction plate 200 is rotated around the rotating shaft 120, the contact portion 210 may be brought into contact with the surface of the rear wheel 110.

When the friction plate 200 is rotated, the contact portion 210 is first brought into contact with the surface of the rear wheel 110; and as the external force is increased, the other areas of the friction plate 200 without the contact portion 210 may also be elastically deformed to be in contact with the surface of the rear wheel 110. However, the action point P2 at which the friction plate 200 applies the braking force to the rear wheel 110 may be positioned at the contact portion 210.

In particular, the contact portion 210 may be positioned on each of both sides of a center of the ground contact surface on which the rear wheel 110 is in contact with the ground and may apply the braking force to each of the both sides of the center of the ground contact surface when the friction plate 200 is in contact with the surface of the rear wheel 110.

That is, the contact portion 210 formed on the lower surface of the friction plate 200 is positioned on each of the both sides of the center of the ground contact surface of the rear wheel 110; and thus even though the friction plate 200 is brought into contact with the surface of the rear wheel 110, the center of the ground contact surface may be kept in a state of being spaced apart from the friction plate 200.

For example, both sides of the rear wheel 110 may be curved to have a shape rounded on the ground contact surface in contact with the ground, and both sides of the friction plate 200 may also be rounded to have a corresponding shape. The contact portion 210 of the friction plate 200 may be positioned on each rounded side of the ground contact surface of the rear wheel 110, and therefore positioned each of both sides of the ground contact surface of the rear wheel 110.

Therefore, since the friction plate 200 is brought into contact with the rear wheel 110 in a state of being spaced apart from the ground contact surface of the rear wheel 110 when the rear wheel 110 is driven, the tire of the rear wheel 110 has an improved durability and reduced deterioration of the braking force, the performance on which depends on tire wear.

The center of the ground contact surface on which the rear wheel 110 is in contact with the ground may be spaced apart from the lower surface of the friction plate 200 even when the friction plate 200 is rotated around the rotating shaft 120 and the lower surface of the friction plate 200 is brought into contact with the surface of the rear wheel 110.

That is, even when the lower surface of the friction plate 200 is in contact with the surface of the rear wheel 110, the center of the ground contact surface on which the rear wheel 110 is in contact with the ground or the entire ground contact surface of the rear wheel 110 may not be in contact with the friction plate 200 and may be separated from the lower surface of the friction plate 200. Accordingly, the ground contact surface of the rear wheel 110 is not worn and a tire has improved durability.

Referring to FIGS. 3 and 4, the foot brake structure for a mobility device may further include a magnetic body 300 positioned at the portion of the friction plate 200 and generating magnetic force between the footboard 100 and the magnetic body 300 so that the friction plate 200 is rotated around the rotating shaft 120 in a direction in which the friction plate 200 is spaced apart from the surface of the rear wheel 110.

The magnetic body 300 may be a permanent magnet or an object generating magnetism depending on power supply such as an electromagnet. The magnetic body 300 is fixedly coupled to the portion of the friction plate 200 and may generate the magnetic force between the footboard 100 and the magnetic body 300 so that the friction plate 200 is rotated around the rotating shaft 120 in a direction in which the friction plate 200 to be spaced apart from the surface of the rear wheel 110.

That is, the magnetic force generated by the magnetic body 300 may be used as a restoring force allowing the lower surface of the friction plate 200 to be spaced apart from the surface of the rear wheel 110 when no external force is applied to the friction plate 200. Therefore, by using the magnetic force instead of the elastic force of a conventional elastic body formed of a soft material, the magnetic body 300 has improved durability and a higher reliability of restoration of the friction plate 200.

In particular, the magnetic body may be positioned above the rotating shaft 120 of the friction plate 200 and generate an attractive force by the magnetic force between the rear end of the footboard 100 and the magnetic body. Since the attractive force acts between the rear end of the footboard 100 and the magnetic body 300 above the rotating shaft 120, the friction plate 200 is moved above the rear wheel 110 and rotated around the footboard 100 in a direction in which the friction plate 200 is spaced apart from the surface of the rear wheel 110.

An object having magnetism may also be positioned on the rear end of the footboard 100 and generate magnetic force between the magnetic body 300 and the object. Alternatively, the rear end of the footboard 100 may be formed of a conductor and generate the magnetic force between the magnetic body 300 and the rear end of the footboard 100.

The magnetic body 300 may generate the magnetic force so that the friction plate 200 is rotated around the rotating shaft 120 and thus the portion of the friction plate 200 is brought into contact with the rear end of the footboard 100 when no external force is applied to the friction plate 200.

That is, when applied with no external force, the friction plate 200 is rotated around the rotating shaft 120 positioned at the portion of the friction plate 200 by the attractive force between the magnetic body 300 and the rear end of the footboard 100; therefore, the friction plate 200 is attracted in a direction in which the friction plate 200 is spaced apart from the surface of the rear wheel 110.

In particular, since the friction plate 200 needs to be rotated only until reaching a preset position spaced apart from the surface of the rear wheel 110, the magnetic force needs to be fixedly set so that the friction plate 200 is rotated only until reaching the preset position and no longer rotated at a position where the portion of the friction plate 200 is brought into contact with the rear end of the footboard 100.

Accordingly, in order to make the portion of the friction plate 200 be in contact with the rear end of the footboard 100 and no longer rotated at a point where the attractive force between the magnetic body 300 and the friction plate 200 is maximized, the portion of the friction plate 200 may be brought into contact with the rear end of the footboard 100 in such a manner that the magnetic body 300 is positioned closest to the rear end of the footboard 100 at the preset position of the friction plate 200.

The foot brake structure for a mobility device may further include a magnetic field sensor 400 positioned at the rear end of the footboard 100 and sensing a change in a magnetic field of the magnetic body 300 as the friction plate 200 is rotated around the rotating shaft 120.

The magnetic field sensor 400 may be, for example, a Hall sensor using a Hall effect. The magnetic field sensor 400 may detect a position of the magnetic body 300 by sensing the change in the magnetic field of the magnetic body 300 and thereby detect whether or not the friction plate 200 is in contact with the surface of the rear wheel 110.

By using such a non-contact magnetic field sensor 400, it is possible to prevent a detection error occurring by dust, water or the like, and therefore reliability of detection is increased.

In addition, both the magnetic field sensor 400 positioned at the rear end of the footboard 100 and the magnetic body 300 of the friction plate 200 may be positioned in a sealed inner portion of the footboard 100 so as not to be exposed to the outside, and thereby securing dustproof and waterproof properties and providing an environmental resistance.

According to another embodiment of the present disclosure, the foot brake structure for a mobility device may further include an elastic body (not illustrated) positioned between the portion of the friction plate 200 and the rear end of the footboard 100 and generating an elastic force so that the friction plate 200 is rotated around the rotating shaft 120 in a direction in which the friction plate 200 is spaced apart from the surface of the rear wheel 110.

One end of the elastic body (not illustrated) is coupled to the portion of the friction plate 200 and the other end of the elastic body is coupled to the rear end of the footboard 100 to rotate the friction plate 200 in a direction in which the friction plate 200 is spaced apart from the surface of the rear wheel 110.

For example, the elastic body (not illustrated) may be positioned above the rotating shaft 120 by which the friction plate 200 is assembled to the rear end of the footboard 100 and generate the attractive force to attract the friction plate 200 toward the footboard 100. Alternatively, the elastic body may be positioned below the rotating shaft 120 by which the friction plate 200 is assembled to the rear end of the footboard 100 and generate a repulsive force to make the friction plate 200 be spaced apart from the footboard 100.

According to another embodiment of the present disclosure, the foot brake structure for a mobility device may further include: an angle sensor (not illustrated) positioned at the rear end of the footboard 100 and sensing a rotation angle at which the friction plate 200 is rotated around the rotating shaft 120; or a distance sensor (not illustrated) sensing a distance between the rear end of the footboard 100 and the friction plate 200.

The angle sensor (not illustrated) and the distance sensor (not illustrated) may be contact sensors or non-contact sensors. For example, the distance sensor (not illustrated) may be a non-contact sensor such as an optical distance sensor, a magnetic field sensor, etc. and the angle sensor (not illustrated) may sense the rotation angle of the friction plate 200 around the rotating shaft 120.

According to the foot brake structure for a mobility device of the present disclosure, the braking force may be improved by amplifying the external force applied by the user.

Further, the friction plate 200 may be brought into contact with the surface of the rear wheel, thereby applying the braking force to the both sides of the ground contact surface of the rear wheel; as a result, the rear wheel tire may have improved durability.

Further, the brake may generate the restoring force using magnetism and have improved durability using the non-contact sensor sensing the magnetic field.

Although the present disclosure is shown and described with respect to specific embodiments, it is apparent to those having ordinary skill in the art that the present disclosure may be variously modified and altered without departing from the spirit and scope of the present disclosure as defined by the following claims.

What is claimed is:

1. A foot brake structure for a mobility device, comprising:
    a footboard having an upper surface extending in a plane direction and having a rear wheel at a rear thereof;
    a friction plate positioned above the rear wheel, having a portion extending forward of the rear wheel and rotatably assembled to a rear end of the footboard by a rotating shaft, and having a lower surface brought into contact with or spaced apart from a surface of the rear wheel depending on whether or not the friction plate is rotated around the rotating shaft;
    a magnetic body positioned at the portion of the friction plate and generating magnetic force between the footboard and the magnetic body so that the friction plate is rotated around the rotating shaft in a direction in which the friction plate is spaced apart from the surface of the rear wheel; and
    a magnetic field sensor positioned at the rear end of the footboard and sensing a change in a magnetic field of the magnetic body as the friction plate is rotated around the rotating shaft,
    wherein when the friction plate is rotated around the rotating shaft by an external force, the lower surface of the friction plate is brought into contact with the surface of the rear wheel, thereby applying a braking force to the rear wheel, and
    an action point at which the friction plate applies the braking force to the rear wheel is closer to the rotating shaft of the friction plate than a press point at which the external force is applied so as to amplify the braking force.

2. The foot brake structure of claim 1, wherein the friction plate is formed in a shape extending to sides of the rear wheel and partially surrounds the sides of the rear wheel.

3. The foot brake structure of claim 1,
    wherein the lower surface of the friction plate has a contact portion protruding toward a side of the surface of the rear wheel, and
    when the friction plate is rotated around the rotating shaft by the external force and the lower surface of the friction plate is brought into contact with the surface of the rear wheel, the action point at which the friction plate applies the braking force to the rear wheel is positioned at the contact portion.

4. The foot brake structure of claim 3, wherein the contact portion is positioned on each of both sides of a center of a ground contact surface on which the rear wheel is in contact with a ground and applies the braking force to each of the both sides of the center of the ground contact surface when the friction plate is in contact with the surface of the rear wheel.

5. The foot brake structure of claim 4, wherein the center of the ground contact surface on which the rear wheel is in contact with the ground is spaced apart from the lower surface of the friction plate even when the friction plate is rotated around the rotating shaft and the lower surface of the friction plate is brought into contact with the surface of the rear wheel.

6. The foot brake structure of claim 1, wherein the magnetic body is positioned above the rotating shaft of the friction plate and generates an attractive force by the magnetic force between the rear end of the footboard and the magnetic body.

7. The foot brake structure of claim 1, wherein the magnetic body generates the magnetic force so that the friction plate is rotated around the rotating shaft and thus the portion of the friction plate is brought into contact with the rear end of the footboard when no external force is applied to the friction plate.

8. The foot brake structure of claim 1, further comprising an elastic body positioned between the portion of the friction plate and the rear end of the footboard and generating an elastic force so that the friction plate is rotated around the rotating shaft in a direction in which the friction plate is spaced apart from the surface of the rear wheel.

9. The foot brake structure of claim 1, further comprising:
   an angle sensor positioned at the rear end of the footboard and sensing a rotation angle at which the friction plate is rotated around the rotating shaft; or
   a distance sensor sensing a distance between the rear end of the footboard and the friction plate.

\* \* \* \* \*